United States Patent [19]

Reuschenbach et al.

[11] 4,303,231

[45] Dec. 1, 1981

[54] CYLINDER-AND-PISTON ROD DEVICE

[75] Inventors: Hermann Reuschenbach, Neuwied; Winfried Wirges, Koblenz; Rolf Langanke, Boppard, all of Fed. Rep. of Germany

[73] Assignee: Stabilus GmbH, Koblenz-Neuendorf, Fed. Rep. of Germany

[21] Appl. No.: 88,865

[22] Filed: Oct. 29, 1979

[30] Foreign Application Priority Data

Nov. 3, 1978 [DE] Fed. Rep. of Germany ....... 2847729

[51] Int. Cl.³ ............................................. F16F 9/02
[52] U.S. Cl. ............................... 267/64.15; 188/300; 267/120
[58] Field of Search ...................... 188/282, 300, 313; 267/65 R, 120, 131

[56] References Cited

U.S. PATENT DOCUMENTS

| | | | |
|---|---|---|---|
| 3,762,514 | 10/1973 | Freitag | 188/300 |
| 3,938,793 | 2/1976 | Kaptanis et al. | 267/120 |
| 4,063,723 | 12/1977 | Wingen | 188/300 X |
| 4,113,071 | 9/1978 | Muller et al. | 188/282 |
| 4,156,523 | 5/1979 | Bauer | 267/120 |
| 4,166,012 | 9/1979 | Freitag et al. | 267/65 R |

FOREIGN PATENT DOCUMENTS

| | | |
|---|---|---|
| 1015327 | 9/1957 | Fed. Rep. of Germany . |
| 1920059 | 7/1970 | Fed. Rep. of Germany . |
| 2800345 | 7/1979 | Fed. Rep. of Germany . |

*Primary Examiner*—Duane A. Reger
*Attorney, Agent, or Firm*—Brumbaugh, Graves, Donohue & Raymond

[57] ABSTRACT

In the illustrative embodiments disclosed, a pressurized cylinder-and-piston rod device, such as a gas spring, includes structure for releasably retaining the piston rod at a terminal position within the cylinder against the fluid pressure tending to expel it. Provision is also made for the fluid pressure to aid in further withdrawing the piston rod into the cylinder after the retaining structure has been engaged.

25 Claims, 4 Drawing Figures

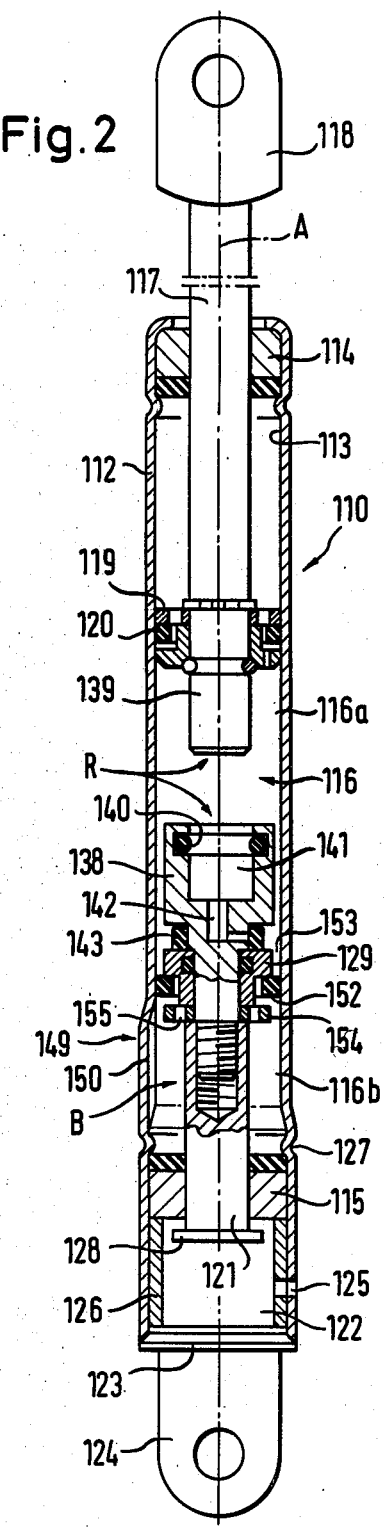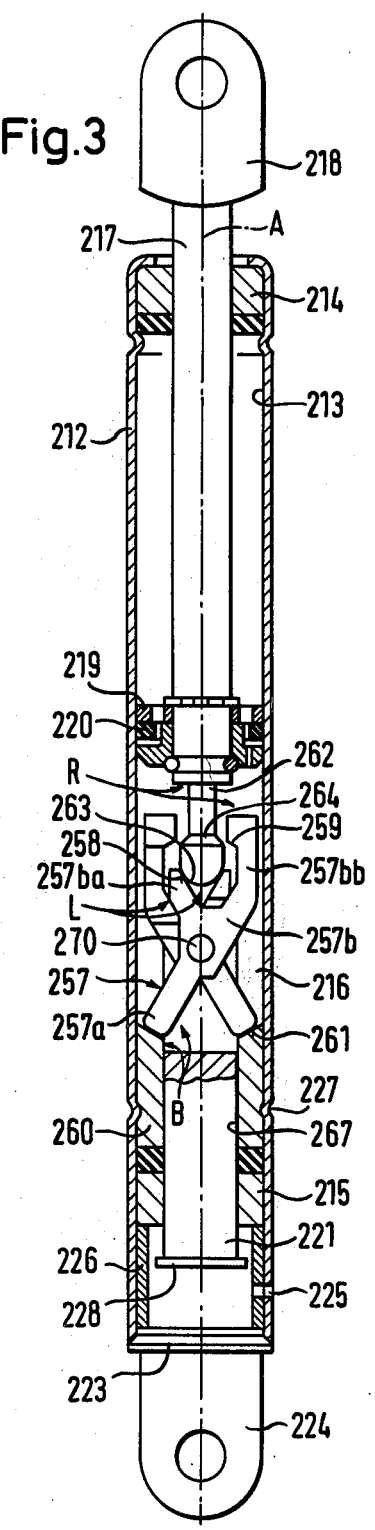

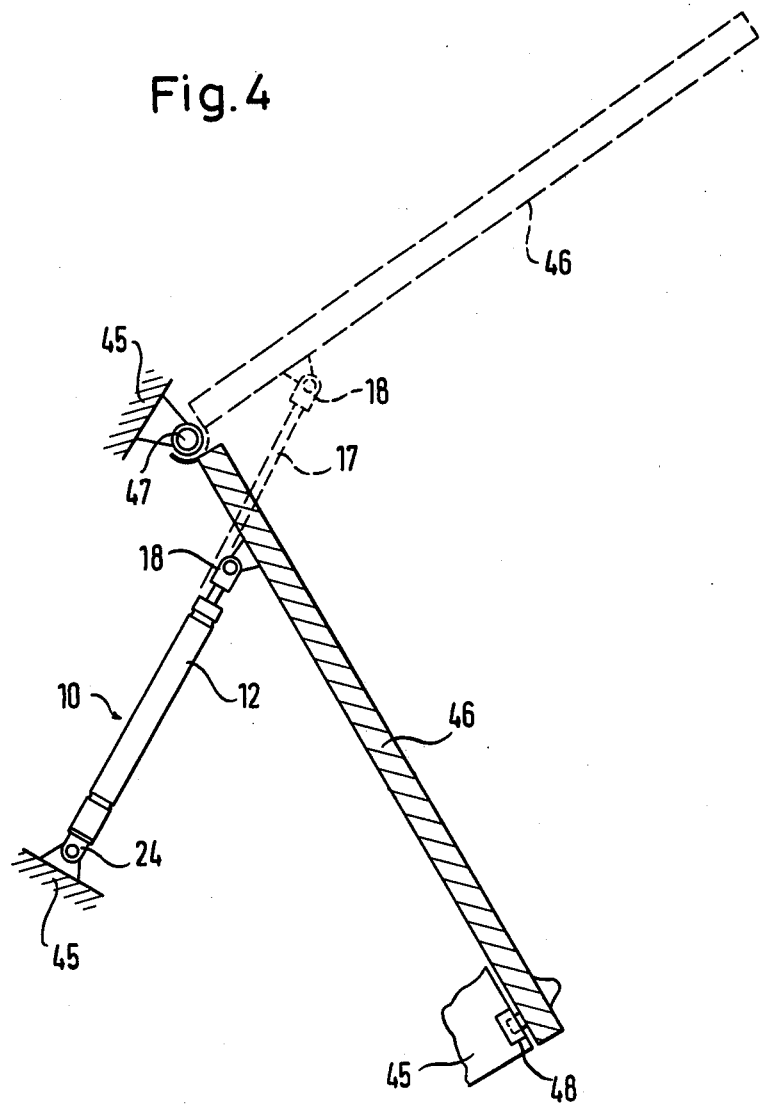

CYLINDER-AND-PISTON ROD DEVICE

BACKGROUND OF THE INVENTION

1. Field of the Invention

The present invention relates generally to pressurized cylinder-and-piston rod devices, such as gas springs, and in particular to improved structure for use with such devices to retain the piston rod in a terminal position within the cylinder.

2. The Prior Art

A prior art cylinder-and-piston rod device of the general type referred to is disclosed in U.S. Pat. No. 4,045,008, issued Aug. 30, 1977, and in the corresponding German Auslegeschrift No. 25 16 478, published Apr. 20, 1978.

In the known device, the retaining structure includes a retaining piston mounted on the piston rod assembly as an axial extension thereof and a retaining cylinder provided at the closed end of the cylinder in a fixed position relative to the cylinder. The retaining piston and the retaining cylinder together define a retaining chamber when the retaining piston has entered the retaining cylinder, which retaining chamber is connected to the larger cylinder cavity by a passage that is provided with a check valve for controlling fluid flow between the retaining chamber and the cylinder cavity. When the retaining piston has entered the retaining cylinder, a retaining action is exerted on the piston rod, via the retaining piston, which acts in a direction opposite to the outward biasing force of the pressurized fluid on the piston rod. The piston rod is thereby held against returning to the outer terminal position as long as no external force is applied to the piston rod tending to withdraw the piston rod assembly towards its outer terminal position. In this device, the retaining action on the piston rod assembly occurs only when, after having been introduced into the retaining cylinder, the piston rod has moved outward thereof for a short distance so as to reduce the pressure within the retaining chamber. It is not possible in this device to modify the retaining action exerted by the retaining structure in such a way as to prevent such outward movement of the piston rod assembly once the retaining piston has entered the retaining cylinder, i.e., once the retaining structure has been engaged.

SUMMARY

The foregoing and other disadvantages of the prior art are overcome by the present invention, in accordance with which part of the structure for retaining the piston rod within the cylinder is provided on and carried by an axially movable plunger member which extends into the cylinder cavity through the end thereof opposite to that through which the piston rod extends. The outer end of the plunger is subjected to a lower pressure than the internal pressure of the cylinder, such that an outwardly-directed bias, opposite in direction to that exerted on the piston rod, would normally act on the plunger member. As a feature of the invention, however, structure is provided for blocking outward movement of the plunger member under such bias until such time as the blocking structure is released, which is accomplished concurrently with or just prior to engagement of the retaining structure for holding the piston rod within the cylinder. In the absense of engagement of the retaining structure, therefore, the plunger member and that part of the retaining structure carried thereby are held against any substantial outward movement relative to the cylinder. Upon engagement of the retaining structure, however, the plunger member is freed for axial movement in either axial direction. This has the advantage of permitting partial or full compensation, as may be desired, for the biasing force exerted by the pressurized fluid on the piston rod.

As another feature of the invention, it is possible, if desired, to achieve a piston rod retaining action without any preliminary short return movement of the piston rod outwardly of the cylinder, such return movement not being necessary to actuate the retaining structure of the invention.

In addition to compensating for the outward bias acting on the piston rod, as aforementioned, it is also possible, in accordance with the invention, completely to override such bias and utilize the fluid pressure to urge the piston rod farther into the cylinder, notwithstanding that the retaining structure is engaged and remains engaged. If the plunger member has a larger cross section than the piston rod, however, the plunger member, and thus also the piston rod, will be drawn farther into the cylinder due to the net greater force exerted on the plunger by the pressurized fluid. This latter feature is particularly advantageous where it is desired automatically to complete a movement of parts, e.g. the closing of a door, to which the cylinder-and piston device is fastened.

In practice, the retaining function, the blocking function, and the releasing function can be implemented in various ways. For instance, the retaining structure may be either mechanical or fluid-operated or a combination thereof, and the same is true for the blocking structure. Also, the different types of blocking devices can be combined with the different types of retaining devices. The pressurized fluid within the cylinder is preferably a pressurized gas, but it is also possible at least partially to fill the cavity with a liquid, a liquid being especially desirable in view of improving the performance of the guiding and sealing units through which the piston rod and plunger member extend.

Although it is not essential to provide the piston rod with a piston, a piston is desirable in many applications, both in view of preventing loss of the piston rod from the cylinder and in view of damping the movement of the piston rod with respect to the cylinder, particularly the movement of the piston rod outward of the cylinder.

BRIEF DESCRIPTION OF THE DRAWINGS

For a further understanding of the invention, its objects and advantages, reference may be made to the following description of exemplary embodiments thereof, taken in conjunction with the accompanying drawings, in which:

FIG. 2 is a longitudinal sectional view of a second embodiment of the invention, showing a modified fluid-operated blocking means;

FIG. 3 is a longitudinal sectional view of a third embodiment, with mechanical retaining means and mechanical blocking means; and FIG. 4 shows a cylinder-and-piston rod device of the invention as incorporated into a motor car construction.

DETAILED DESCRIPTION

Figure 1:
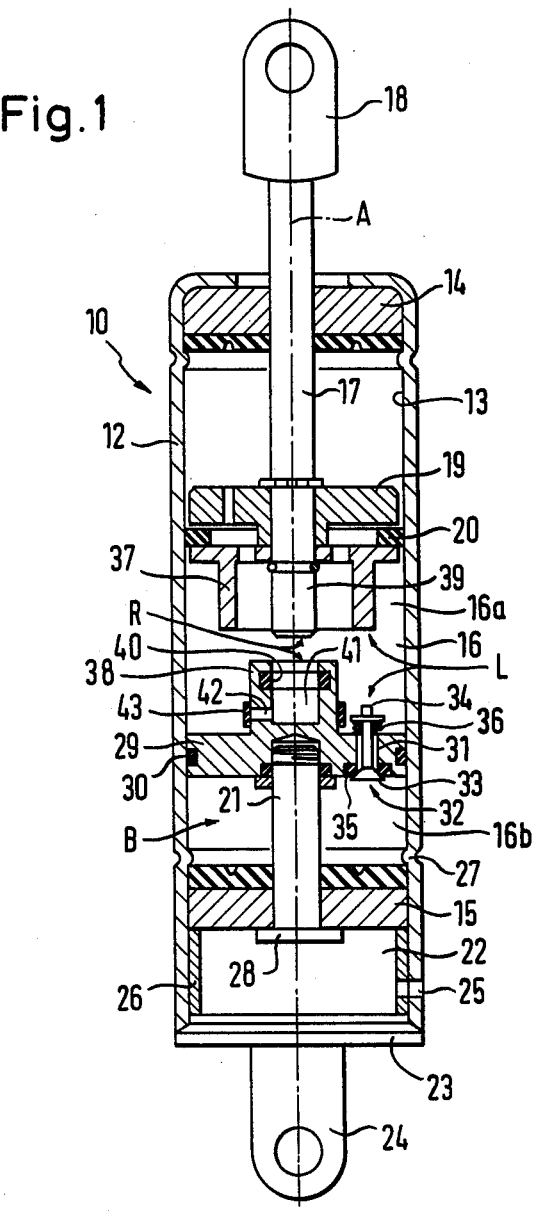
FIG. 1 is a longitudinal sectional view of a first embodiment of the invention, with fluid-operated retaining means and fluid-operated blocking means.

In the embodiment of FIG. 1, the cylinder-and-piston rod device is designated generally by the numeral 10. It includes a cylinder 12, having a longitudinal axis A, and an inner cylindrical face 13. In the upper and lower (as viewed in FIG. 1) ends of the cylinder 12 there are provided first and second guiding and sealing units 14 and 15, respectively, of known construction. Within the cylinder 12 and between the guiding and sealing units 14 and 15, there is defined a sealed cylinder cavity 16. A piston rod 17 is introduced into the cavity 16 through the first guiding and sealing unit 14, and includes at its outer end a conventional fastening block or element 18. The piston rod 17 is provided at its inner end with a damping piston 19 and piston ring 20 of known construction, the piston ring 20 being axially movable with respect to the damping piston 19 in the well known manner to increase the damping action when the piston rod 17 moves upwards and reduce the damping action when the piston rod 17 moves downwards. The cavity 16 contains a pressurized gas which exerts an upward directed biasing force on the piston rod 17, the magnitude of the force being proportional to the product of the gas pressure and the cross section of the piston rod 17.

A plunger member 21 is introduced into the cavity 16 through the second guiding and sealing unit 15. The lower end of this plunger member 21 extends into a chamber 22 defined within the cylinder 12 between a lower terminal plug 23 and the guiding and sealing unit 15. The terminal plug 23 is provided with an external fastening block or element 24. The chamber 22 is connected to atmosphere by a bore 25. The guiding and sealing unit 15 is axially fixed within the cylinder 12 by an annular bush 26 and a radially inwardly directed bead 27 on the cylinder wall. As shown in FIG. 1, the bore 25 extends through both the cylinder wall and the bush 26. The lower end of the plunger member 21 is provided with an abutment disc 28, which abutment disc 28 defines the axial limits of movement of the plunger 21 between a lower abutting position at which the disc 28 abuts the terminal plug 23 and an upper abutting position (shown in FIG. 1) at which the disc 28 abuts the guiding and sealing unit 15.

A blocking piston 29 is mounted on the plunger member 21 inside the cavity 16, which blocking piston 29 separates the cavity 16 into a first compartment 16a and a second compartment 16b. The blocking piston 29 is in sealing contact with the inner cylindrical face 13 through a sealing ring 30 and is formed with a channel 31 interconnecting the compartments 16a and 16b. Fluid flow through the channel 31 is governed by a normally-closed control valve 32, which includes a valve member 33, a valve shaft 34, and a valve spring 36 for urging the valve member 33 against a valve seat 35. The valve shaft 34 is in alignment with a control sleeve 37 mounted on the lower end of the piston rod 17.

The plunger member 21 is further provided with a retaining cylinder 38, which in the embodiment of FIG. 1 is part of the blocking piston 29. It will be understood that the retaining cylinder 38 could comprise a separate member if desired. The retaining cylinder 38 cooperates with a retaining piston 39 provided on piston rod 17. Here again, in the embodiment of FIG. 1, the retaining piston 39 is an integral lower extension of the piston rod 17; it could, however, be a separate element. A sealing ring 40 is provided inside the retaining cylinder 38 for sealingly engaging the surface of the retaining piston 39 when it enters the retaining cylinder 38, thereby defining a retaining chamber 41 within the retaining cylinder 38. The retaining chamber 41 is connected by a radial bore 42 with a first compartment 16a of the cavity 16. A retaining check valve 43 in the form of an elastic circular sleeve made of rubber is associated with and normally closes the bore 42.

As will be appreciated, when the device 10 is not subject to an external axial force the piston rod 17 will tend to move to its most upward (outer) terminal position in which the piston rod is inserted into the cavity 16 to a minimum extent. Upon the application of an external force to the outer end of the piston rod 17, however, the piston rod can be moved downward toward a second (inner) terminal position. FIG. 1 illustrates the piston rod 17 and piston 19 in an intermediate position between the aforementioned terminal positions.

As long as the retaining piston 39 is remote from the retaining cylinder 38 and the control sleeve 37 is out of engagement with the control valve 32, the blocking piston 29 will move axially only to a small extent when the piston rod 17 is moved downward. This slight movement of the blocking piston 29 corresponds to the increased pressure in compartment 16a, which occurs when an increased volume within compartment 16a is occupied by the downward moving piston rod 17.

When the piston rod 17 arrives in position to engage the retaining structure, i.e. when the retaining chamber 41 is closed by the retaining piston 39, the pressure within the retaining chamber 41 increases and the retaining check valve 43 opens, so that the pressurized fluid from retaining chamber 41 is expelled through bore 42. The control sleeve 37 and the valve shaft 34 are preferably dimensioned and arranged such that immediately after the retaining chamber 41 has been closed by the piston 39, the control sleeve 37 abuts the valve shaft 34, thereby opening the control valve 32 to connect compartment 16a to compartment 16b via the channel 31. The blocking piston 29 is therefore free to be moved further downward (axially inward) by further downward movement of the piston rod 17. On such downward movement of the blocking piston 29, fluid from compartment 16b can escape through bore 31 to compartment 16a.

If the cross section of the plunger member 21 is equal to or substantially the same as the cross section of piston rod 17, no substantial force need be exerted on piston rod 17 for effecting such further downward movement because the upward-directed (outward) biasing force of the pressurized fluid exerted on the cross section of the piston rod 17 is fully compensated for by the biasing force exerted by the same pressurized fluid on the plunger member 21. Hence the piston rod 17 can readily be moved downward toward its lower terminal position, in which the lower end of the retaining piston 39 abuts the bottom of the retaining cylinder 38 and the abutment disc 28 of the plunger member 21 abuts the terminal block 23.

When the piston rod 17 is thereafter moved upwards, it pulls the blocking piston 21 behind it due to the retaining action between retaining piston 39 and retaining cylinder 38. This retaining action is due to a pressure reduction in retaining chamber 41 resulting from the initial slight movement of the retaining piston 39 from the retaining cylinder 38. The upward movement of the piston rod 17 and the blocking piston 29 is effected quite easily, with the external force required being substantially only that needed to overcome frictional resistance among the several parts. This results because, during the upward movement of the piston rod 17, the biasing forces exerted on the piston rod 17 and on the plunger member 21 compensate each other, as long as the control valve 32 is open. It is only when the abutment disc 28 abuts the second guiding and sealing unit 15 that the retaining action of the retaining cylinder 38 and the retaining piston 39 must be overcome if further upward movement of the piston rod 17 is to take place, that an increased withdrawal force acting on piston rod 17 is necessary. Before or simultaneously with the opening of retaining chamber 41 by the upward moving retaining piston 39, the control valve 32 closes again due to the withdrawal of the control sleeve from the valve shaft 34.

In the embodiment of FIG. 1, the retaining structure, including in principal part the piston 39, the cylinder 38, and the retaining check valve 43, is generally designated by the letter R, the blocking structure, including in principal part the piston 29, the second compartment 16b, and the plunger 21, is designated generally by the letter B, and the blocking-action releasing means, including in principal part the valve shaft 34, the control sleeve 38, the channel 31, and the valve member 33, is generally designated by the letter L.

If the cross section of the plunger member 21 is greater than the cross section of the piston rod 17, the biasing force exerted by the pressurized fluid on the piston rod 17 is smaller than the biasing force exerted by the pressurized fluid on the plunger 21 after the retaining piston 39 has entered the retaining cylinder 38 and the control valve 32 has been opened. Therefore the combined system consisting of the piston rod 17 and the plunger member 21 and the parts fastened thereto is moved downward (as shown in FIG. 1) until the abutment disc 28 abuts the terminal plug 23. When the piston rod 17 is to be moved upward again towards its upper terminal position, this is only possible with an external upward directed force overcoming the resulting biasing action of the pressurized gas, which resulting biasing action is equal to the product of the fluid pressure within cavity 16 and the difference of cross section of plunger 21 and piston rod 17. Once the abutment disc 28 abuts the guiding and sealing unit 15 and the retaining piston 39 is withdrawn from the retaining cylinder 38 and the control valve shaft 34 is free of contact with the control sleeve 37, the behavior of the device is identical to the behavior of the device as discussed above with the piston rod 17 and the plunger member 21 having substantially the same cross sections.

As will be understood, in the above-described construction a certain return (outward) movement of the retaining piston 39 relative to the retaining cylinder 38 is necessary before a retaining action occurs. In accordance with the invention, however, this return movement can be easily compensated for by slightly increasing the cross section of plunger member 21 beyond the cross section of piston rod 17. In this case, no return movement of the piston rod 17 with respect to cylinder 12 need occur in order to build up retaining conditions in the retaining chamber 41, because the plunger member 21 moves downward with respect to the cylinder and thereby generates the necessary reduced pressure retaining conditions in retaining chamber 41. Also, the cross section of the retaining piston 39 may be greater than the cross section of the piston rod 17 for increasing the retaining force retaining the retaining piston 39 in the retaining chamber 38.

In FIG. 4, the device 10 is shown in a representative application as a part of a motor car construction. The motor car body is designated by 45, to which a lid 46, e.g., the trunk or hood lid, is pivotably mounted about a horizontal axis 47. The device 10 is pivotably connected by the fastening element 24 to the motor car body 45 and by the fastening element 18 to the lid 46. In the arrangement illustrated, the device is intended for facilitating the lifting of the lid 46 from the position shown in full lines to the position shown in dotted lines. As will be seen from FIG. 4, the piston rod 17 is fully inserted into the cylinder 12 when the lid 46 is in its closed position. This means that in the closed position the retaining means as described above are active and there is no lifting force exerted by the device 10 on the lid 46. This is in many cases desirable, since the device 10 exerts no bending forces on the lid 46 when it is closed. This is of particular importance, for instance, where only one gas spring device 10 is used and the lock 48 of the lid is offset with respect to the gas spring device along the pivoting axis 47. It may also be desirable, for safety reasons, that the lid 46 be drawn downwards by the gas spring device 10 when the lid 46 approaches its closed position so as automatically to lock the lid even if the driver does not attend to the locking. In accordance with the invention, this downward moving force on the lid can be exerted by the gas spring device as described above by using a greater cross section for the plunger member 21.

In FIG. 2, analogous parts have been designated with the same reference numbers as in FIG. 1, increased by 100. Except as otherwise noted, the structure of FIG. 2 is essentially unchanged from that of FIG. 1, the retaining means R, for example, being substantially identical in both embodiments. The blocking means B are likewise of identical concept and rely on a blocking valve separating compartments 116a and 116b of the cavity 116. The cylinder 112 is provided in this embodiment with a longitudinal section 149 of increased cross section by virtue of a radial groove 150 formed in the inner cylindrical face 113 of the cylinder. A blocking piston 129 is provided with a piston ring 152, which piston ring is in frictional engagement with the inner cylindrical face 113 along its total length and is also in total sealing engagement with the inner cylindrical face 113 except over the longitudinal section 149. The blocking piston 129 has a slightly smaller diameter than the inner cylindrical face 113, thereby defining a gap 153 between the blocking piston 129 and the inner cylindrical face 113. The piston ring 152 is capable of a small axial movement with respect to the piston 129, which movement is limited by the piston 129 on the one hand and a piston ring retaining disc 154 on the other hand. The piston ring 152 is shown in FIG. 2 in a first, upper terminal position with respect to the piston 129 in which it sealingly abuts the piston 152 to block fluid flow between the first and second compartments 116a and 116b. Axial holes 155 are provided in the piston ring retaining disc 154, so that when piston ring 152 is in its second, lower terminal position with respect to piston 129, i.e. adjacent the retaining disc 154, a passage is opened across piston 129. This passage is defined by the holes 155, the inner periphery of the piston ring 152, the axial distance between the piston ring 152 and the piston 129, and the gap 153.

As long as the retaining piston 139 is axially outside the retaining cylinder 138, the device of FIG. 2 behaves as the device of FIG. 1. Similarly, as soon as the retaining piston 139 enters the retaining cylinder 138 the retaining action is activated. Upon further downward movement of the piston rod 117 by an increased external force the piston ring 152 reaches the longitudinal section 149 and a passage defined by the groove 150 is opened across the piston 129 and interconnects compartments 116a and 116b. A small increase of the external force is sufficient, if one takes care that the piston ring 152 is very close to the groove 150 at the moment, in which the retaining action is activated. Assuming that the cross section of piston rod 117 and the cross section of plunger member 121 are substantially the same, further downward movement of the piston rod 117 is not resisted by the internal fluid pressure, since the biasing actions on the piston rod 117 and the plunger member 121 compensate each other. When, thereafter, the piston rod 117 is pulled upwards again by an external force, the same is true. During such upward movement the piston ring 152 is adjacent the retaining disc 154, whereby the aforementioned passage through the holes 155 is opened. When, during such upward movement, the abutment disc 128 at the lower end of the plunger 121 abuts the sealing and guiding unit 115 the piston ring 152 has already moved above the longitudinal section 149. Then if the piston rod 117 is moved still farther upwards, the retaining action between the retaining piston 139 and the retaining cylinder 138 is overcome. When this retaining action is overcome, the compartments 116a and 116b are still in fluid connection due to the piston ring 152 being adjacent retaining disc 154. The pressurized fluid acting onthe cross section of plunger member 121 moves plunger member 121 downward until piston ring 152 has reached its first, upper terminal position with respect to piston 152, as shown in FIG. 2. Compartment 116b is thus tightly sealed from compartment 116a and further downward movement of the blocking piston 129 is blocked.

If desired, the plunger member 121 in the embodiment of FIG. 2 may be provided with a greater cross section than the piston rod 117, with the same functional advantages as discussed above in connection with the embodiment of FIG. 1.

In the embodiment of FIG. 3, analogous parts have again been designated with the same reference numbers as in FIG. 1 increased by 200 and, except as otherwise noted, are structurally and functionally the same. In this embodiment, two substantially identical levers 257 are pivotally mounted on the inner end of the plunger member 221 within cavity 216 about mounting pin 270. Each lever 257 comprises a first arm 257a and a second arm 257b. The second arm 257b is bifurcated and comprises two branches 257b a and 257b b. A first engagement face 258 is provided on branch 257b a and a second engagement face 259 is provided on branch 257b b. An annular abutment member 260, which is part of the guiding and sealing unit 215, provides an annular abutment face 261. An axially extending control member 262 is mounted to the piston rod 217 and forms the lower end thereof. The control member is provided with a first chamferedcounter engagement face 263 and a second conical counter engagement face 264. As long as the control member 262 is remote from the levers 257, the device of FIG. 3 behaves like the device of FIG. 1, the plunger member 221 being axially blocked by the engagement of arms 257a with the annular abutment face 261.

When, under the application of an external force, the piston rod 217 is moved downward in FIG. 3, the first counter engagement face 263 of the control member 262 contacts the first engagement face 258 of levers 257. Levers 257 are therefore pivoted about the mounting pin 270, so that the blocking action of the arms 257a and abutment face 261 is released. At the same time, the second engagement faces 259 overlie the second counter engagement face 264, so that control member 262 is retained by the levers 257. The second engagement faces 259 and the second counter engagement face 264 may therefore also be regarded as retaining faces, and the control member 262 may be regarded as a first retaining member and the arms 257b as second retaining members. In this embodiment, therefore, the arms 257b b and the control member 262 in part comprise the retaining structure R, the arms 257a and the abutment member 260 may be regarded as part of the blocking structure B, and the control member 262 and the branches 257b a together may be regarded as part of the releasing structure L.

When the blocking means B have been released and the arms 257a are out of engagement with the abutment face 261, the plunger member 221 is moved downward by the action of the pressurized gas on the plunger member 221, which action overcomes the upwardly directed biasing action on piston rod 217 because, as illustrated in FIG. 3, the cross section of the plunger member 221 is greater than the cross section of the piston rod 217. The resulting downward directed force corresponds to the product of the pressure within cavity 216 and the difference between the cross sections of the plunger member 221 and the piston rod 217. The plunger member 221 thus moves downward and pulls the piston rod 217 downward due to the retaining action of the faces 259, 264. This downward movement is continued until the abutment disc 228 abuts the plug 223. Contact of the retaining faces 259 and 264 is maintained during this downward movement by the engagement of arms 257 with the axial guiding face 267 of the abutment member 260.

When the piston rod 217 is thereafter once again pulled upward by an external upwardly directed force, the plunger member 221 follows due to the retaining action of faces 259, 264 until the arms 257a reach the abutment face 261. When this occurs, the levers 257 are swung radially outward by the engagement of the faces 259, 264, so that the control member 262 is freed, i.e. the retaining structure R is inactivated. The piston rod 217 is thereafter subjected to the full upward biasing force of the pressurized gas which, in the absence of a downwardly acting external force, pushes the piston rod 217 upwards.

It will be readily understood that the faces 258 and 259 on the lever arms 257b can be designed in such a way that, after the retaining structure R has once been activated by control member 262, the piston rod 217 will be positively retained by the retaining means and that not even a short upward movement of the piston rod 217 will occur before the retaining force become effective.

Although the present invention has been particularly shown and described with reference to representative embodiments thereof, it will be understood by those skilled in the art that various modifications and variations of such embodiments may be made without departing from the spirit and scope of the invention. All such modifications and variations are intended to be encompassed within the scope of the appended claims.

We claim:

1. A cylinder-and-piston rod device, comprising:
   (a) a cylinder having a longitudinal axis and defining a sealed cavity therein;
   (b) first and second guiding and sealing units provided at first and second ends, respectively, of said cavity;
   (c) a piston rod extending axially into said cavity through said first guiding and sealing unit and being axially movable relative thereto between a first terminal position, in which said piston rod extends into said cavity to a minimum extent, and a second terminal position, in which said piston rod extends into said cavity to a maximum extent;
   (d) a pressurized fluid in said cavity;
   (e) a plunger member extending axially into said cavity through said second guiding and sealing member and being axially movable relative thereto, the axially outer end of said plunger member being exposed to a lower pressure than the pressure of said pressurized fluid in said cavity;
   (f) releasably-engageable retaining means carried in part by said plunger member and in part by said piston rod for, when engaged, holding said piston rod against movement towards said first terminal position by the force exerted on said piston rod by said pressurized fluid and, when disengaged, permitting such movement of said piston rod towards said first terminal position;
   (g) blocking means carried in part by said plunger member and in part by said cylinder for blocking movement of said plunger member axially outward of said cavity in the direction of said second terminal position when said retaining means are disengaged; and
   (h) releasing means carried by at least one of said piston rod, said plunger member and said cylinder for releasing said blocking means to permit said axially outward movement of said plunger member when said retaining means are engaged, whereby the force exerted on said plunger member by said pressurezed fluid at least partially compensates for said force exerted on said piston rod.

2. The cylinder-and-piston rod device of claim 1, wherein said blocking means includes means for limiting movement of said plunger member axially outward of said cavity.

3. The cylinder-and-piston rod device of claim 1, wherein said blocking means includes means for limiting movement of said plunger member axially inward of said cavity.

4. The cylinder-and-piston rod device of claim 1, wherein said plunger member is generally cylindrical and is guided in said second unit such that its longitudinal axis is parallel to the longitudinal axis of said cylinder.

5. The cylinder-and-piston rod device of claim 1, wherein the cross sectional areas of said plunger member and said piston rod are substantially equal.

6. The cylinder-and-piston rod device of claim 1, wherein the cross sectional area of said plunger member is larger than the cross sectional area of said piston rod, whereby the force exerted on said plunger member by said pressurized fluid is greater than the force exerted by said fluid on said piston rod.

7. The cylinder-and-piston rod device of claim 1, wherein said cylinder extends axially outward of said second guiding and sealing unit and defines a chamber surrounding the axially outer end of said plunger member, said chamber being sealed from said cavity by said second guiding and sealing unit, the pressure within said chamber being lower than the pressure within said cavity.

8. The cylinder-and-piston rod device of claim 7, wherein said chamber is connected to atmosphere.

9. The cylinder-and-piston rod device of claim 1, wherein:
   said blocking means comprises an abutment member carried by said cylinder and at least one blockinhg member movably mounted on said plunger member for movement between a position of engagement with said abutment member and a position of non-engagement with said abutment member; and
   said releasing means comprises a control member carried by said piston rod for moving said blocking member between said positions of engagement and non-engagement with said abutment member.

10. The cylinder-and-piston rod device of claim 9, wherein said blocking member includes means defining first and second engagement faces for engagement with said control member, said control member engaging said first engagement face when said piston rod axially approaches a position of engagement of said retaining means to move said blocking member to said position of non-engagement with said abutment member, said control member engaging said second engagement face when said piston rod moves axially away from said position of engagement of said retaining means, in the direction of said first terminal position, to move said blocking member into said position of engagement with said abutment member.

11. The cylinder-and-piston rod device of claim 9, wherein said blocking member is pivotally mounted on said plunger member about a pivotal axis that is perpendicular to the longitudinal axis of said cylinder.

12. The cylinder-and-piston rod device of claim 11, wherein said blocking member comprises a lever member having two arms, one of said arms being engageable with said abutment member and the other of said arms carrying said means defining said first and second engagement faces.

13. The cylinder-and-piston rod device of claim 12, wherein said other arm of said lever member is bifurcated into two branches, one branch of said other arm carrying means defining said first engagement face and the other branch carrying means defining said second engagement face.

14. The cylinder-and-piston rod device of claim 9, wherein said abutment member comprises part of said second guiding and sealing unit.

15. The cylinder-and-piston rod device of claim 9, wherein said control member comprises an axial extension, in the direction of said plunger member, of said piston rod.

16. The cylinder-and-piston rod device of claim 1, wherein said retaining means comprises a first retaining member carried by said piston rod and at least one second retaining member movably mounted on said plunger member for movement between a position of engagement with said first retaining member and a position of non-engagement with said second retaining member, said first and second retaining members including means defining respective first and second substantially axially-directed retaining faces, said second retaining member further including means for coacting with an axially extending surface carried by said cylinder to hold said second retaining member in said position of engagement with said first retaining member throughout the length of travel of said piston rod during which said retaining means are engaged.

17. The cylinder-and-piston rod device as set forth in claim 16, wherein said axially extending surface is defined by a plunger-member guiding face of said second guiding and sealing unit.

18. The cylinder-and-piston rod device of claim 12, wherein said retaining means further includes said other arm and said second engagement face defined thereon, said one arm being engageable with a plunger-member guiding face of said second guiding and sealing unit, when said one arm is out of engagement with said abutment member, to hold said second engagement face in retaining position relative to said control member.

19. The cylinder-and-piston rod device of claim 1, wherein:
said blocking means comprises a blocking piston assembly mounted on said plunger member, said blocking piston assembly axially separating said cavity into first and second compartments, said first compartment receiving said piston rod and said second compartment receiving said plunger member; and
said releasing means comprises means for preventing fluid flow axially across said blocking piston when said retaining means are out of engagement, whereby said plunger member is held against axial movement outward of said cavity, and for permitting fluid flow axially across said blocking piston when said retaining means are in engagement, whereby said plunger member is freed to move axially outward of said cavity.

20. The cylinder-and-piston rod device of claim 19, wherein said releasing means includes means defining a passage axially through said blocking piston assembly, valve means for opening and closing passage, and means carried by said piston rod for opening said valve means substantially concurrently with the engagement of said retaining means.

21. The cylinder-and-piston rod device of claim 19, wherein said releasing means includes a longitudinal section of said cylinder over which the inner cross sectional area thereof is greater than the cross sectional area of said blocking piston assembly, so as to define a passage for fluid flow across said blocking piston assembly when said assembly is within said longitudinal section; said longitudinal section beginning adjacent the axial position within said cavity of said blocking piston assembly when said retaining means is first engaged as said piston rod moves towards said second terminal position and extending axially therefrom towards and encompassing the axial position of said blocking piston assembly when said piston rod is at said second terminal position, whereby said plunger member is permitted to move axially outward of said cavity when said retaining means is engaged; said blocking piston assembly when at said position of first engagement of said retaining means sealingly contacting the inner cylindrical surface of said cylinder adjacent the beginning edge of said section substantially to prevent fluid flow across said blocking piston assembly until said assembly is moved slightly into said section.

22. The cylinder-and-piston rod device of claim 21, wherein said greater cross sectional area is defined by a substantially axially extending groove formed in the inner cylindrical face of said cylinder over said longitudinal section.

23. The cylinder-and-piston rod device of claim 21, wherein said blocking piston assembly comprises:
a blocking piston and a piston ring axially movable with respect to said blocking piston between two terminal positions, said piston ring being in frictional and sealing engagement with the inner cylindrical face of said cylinder when said piston ring is axially outside said longitudinal section, said piston ring being moved to said first terminal position when said plunger member moves outward of said cavity and to said second terminal position when said plunger member moves inward of said cavity; and
means defining an auxiliary fluid passage axially across said piston ring, said auxiliary fluid passage being closed by said piston ring when said piston ring is in said first terminal position and opened when said piston ring is in said second terminal position.

24. The cylinder-and-piston rod device of claim 1, wherein said retaining means comprises a retaining piston element and a retaining cylinder element, one of said retaining elements being carried by the piston rod and the other being carried by the plunger member, the retaining piston element and the retaining cylinder element being axially aligned for entry of said retaining piston into said retaining cylinder so as to define therewith a retaining chamber, retaining passage means for connecting said retaining chamber with said cavity and including check valve means for opening said retaining chamber to said cavity when said retaining piston enters said retaining cylinder, thereby to reduce the fluid pressure within said retaining chamber and hold said retaining piston therein.

25. The cylinder-and-piston rod device of claim 1, wherein a damping piston is fastened to said piston rod.

* * * * *